US 6,550,278 B2

(12) United States Patent
Mitani et al.

(10) Patent No.: US 6,550,278 B2
(45) Date of Patent: Apr. 22, 2003

(54) METHOD OF MANUFACTURING GLASS SUBSTRATE FOR USE AS INFORMATION RECORDING MEDIUM

(75) Inventors: Kazuishi Mitani, Osaka (JP); Yasuhiro Saito, Osaka (JP); Koichi Ataka, Osaka (JP); Akihiro Koyama, Osaka (JP); Junji Kurachi, Osaka (JP); Nobuyuki Yamamoto, Osaka (JP); Yoshihiro Matsuno, Osaka (JP)

(73) Assignee: Nippon Sheet Glass Co., Ltd., Osaka (JP)

( * ) Notice: Subject to any disclaimer, the term of this patent is extended or adjusted under 35 U.S.C. 154(b) by 0 days.

(21) Appl. No.: 10/213,554

(22) Filed: Aug. 6, 2002

(65) Prior Publication Data

US 2003/0031878 A1 Feb. 13, 2003

Related U.S. Application Data

(62) Division of application No. 09/526,583, filed on Mar. 16, 2000.

(30) Foreign Application Priority Data

Mar. 18, 1999 (JP) .............................. 11-73206

(51) Int. Cl.$^7$ ............................................ C03C 21/00
(52) U.S. Cl. ........................................ 65/30.14; 65/31
(58) Field of Search .......................... 65/30.13, 30.14, 65/31

(56) References Cited

U.S. PATENT DOCUMENTS

| 3,317,297 | A | * | 5/1967 | Ray ........................... 65/30.14 |
| 4,042,359 | A | * | 8/1977 | Schnabel et al. .............. 65/439 |
| 4,187,094 | A | * | 2/1980 | Lu et al. ...................... 65/30.1 |
| 5,120,605 | A | * | 6/1992 | Zuel et al. ................... 428/410 |
| 5,804,317 | A | * | 9/1998 | Charrue ...................... 428/410 |
| 6,132,843 | A | * | 10/2000 | Kuroda et al. .............. 428/141 |
| 6,134,918 | A | * | 10/2000 | Eto et al. ................... 65/30.14 |
| 6,187,441 | B1 | * | 2/2001 | Takeuchi et al. ............ 428/410 |

* cited by examiner

Primary Examiner—Sean Vincent
(74) Attorney, Agent, or Firm—Merchant & Gould P.C.

(57) ABSTRACT

A glass substrate for use as an information recording medium has an average surface roughness (Ra) in the range of 0.3 nm≦Ra<3.0 nm and includes surface irregularities shaped and distributed isotropically and arranged substantially in succession. The surface irregularities include 5 to 50,000 convexities having a height of at least 3 nm and no convexities having a height of at least 15 nm within an area of 50 μm×50 μm. A porous region produced by an acid treatment process in the glass substrate would be completely removed if excessively etched by an alkaline solution. However, the etching process using the alkaline solution can be stopped at a stage where the pores in the porous region are enlarged by controlling conditions for the acid and alkali treatment processes.

8 Claims, 3 Drawing Sheets

METHOD OF MANUFACTURING GLASS SUBSTRATE FOR USE AS INFORMATION RECORDING MEDIUM

This application is a divisional of application Serial No. 09/526,583, filed Mar. 16, 2000, which application(s) are incorporated herein by reference.

BACKGROUND OF THE INVENTION

1. Field of the Invention

The present invention relates to a glass substrate for use as an information recording medium such as a magnetic disk or the like which can be used as a hard disk, and a method of manufacturing such a glass substrate.

2. Description of the Related Art

Hard disk drives has magnetic heads which are slightly lifted off corresponding magnetic surfaces of hard disks as they rotate in reading data from and storing data in the hard disks.

If a hard disk has a perfectly flat surface, then when a magnetic head is to be lifted off the hard disk surfaces from a CSS (Contact Start-Stop) mode, the magnetic head tends to adhere to the hard disk surface. Therefore, it has been customary for hard disk surfaces to have minute surface roughness referred to as texture.

Conventional texturing techniques for roughening hard disk surfaces include a film texturing process for growing a film with a rough surface on the surface of a glass substrate and a laser texturing process for applying a laser beam to form surface roughness directly on a glass substrate.

Recent higher-density recording hard disk designs require hard disk drives to reduce the height of lifted magnetic heads while operating in a seek mode.

The inventor has found that the surface roughness of a glass substrate for use as a hard disk has to satisfy certain conditions in order to avoid adhesion or sticking of the magnetic head which is lifted to a reduced height.

However, the conventional texturing processes including the film texturing process and the laser texturing process fail to produce the level of fine surface roughness which satisfies those conditions.

SUMMARY OF THE INVENTION

According to the present invention, a glass substrate for use as an information recording medium has a finely roughened surface on which a magnetic film is to be formed, said finely roughened surface having an average surface roughness (Ra) in the range of 0.3 nm≦Ra<3.0 nm and including surface irregularities shaped and distributed isotropically and arranged substantially in succession, the surface irregularities including 5 to 50,000 peaks or convexities having a height of at least 3 nm and no convexities having a height of at least 15 nm within an area of 50 $\mu$m×50 $\mu$m. The glass substrate has an acid-resistant criterion in terms of an etching rate of at least 16 nm/min. upon contact with hydrofluoric acid at a temperature of 50° C. and a concentration of 0.1 weight %.

The average surface roughness (Ra) is extended three-dimensionally such that the central-line average roughness defined by JIS B0601 is applicable to a measured surface (10 $\mu$m×10 $\mu$m), and is defined as follows:

$$Ra = (1/n)\sum_{i=1}^{n} \text{abs}(Zi - Z0)$$

where n represents the number of data points of a scanning probe microscope, abs an absolute value, Zi an ith data value of the scanning probe microscope, and $$Z0 = 1/n \sum_{i=1}^{n} Zi$$

When the surface of the glass substrate is chemically strengthened by an ion exchange to produce a surface compressive stress, the glass substrate is made suitable for hard disks.

If the glass substrate contains $SiO_2$ and $Al_2O_3$, then the difference ($SiO_2$—$Al_2O_3$) between their molar fractions (molar %) is preferably at most 59.5 molar %.

FIG. 1 of the accompanying drawings shows the relationship between the difference ($SiO_2$—$Al_2O_3$) and the average surface roughness (Ra). It can be seen from FIG. 1 that if the difference ($SiO_2$—$Al_2O_3$) between the molar fractions exceeded 59.5 molar %, the surface roughness (Ra) of the roughened surface could not exceed 0.3 nm even when the concentration of the hydrofluoric acid or sulfuric acid used in an acid treatment process.

FIG. 2 of the accompanying drawings shows the relationship between the difference ($SiO_2$—$Al_2O_3$) between the molar fractions and the number of convexities having a height of at least 3 nm in the area of 50 $\mu$m×50 $\mu$m. A study of FIG. 2 reveals that if the difference ($SiO_2$—$Al_2O_3$) between the molar fractions exceeded 59.5 molar %, the number of convexities having a height of at least 3 nm would be at most 5.

FIG. 3 of the accompanying drawings shows the relationship between the difference ($SiO_2$—$Al_2O_3$) between the molar fractions and the acid resistance of the glass substrate (the etching rate (nm/min.) upon contact with hydrofluoric acid at a temperature of 50° C. and a concentration of 0.1 weight %). A review of FIG. 3 indicates that if the difference ($SiO_2$—$Al_2O_3$) between the molar fractions exceeded 59.5 molar %, the acid resistance of the glass substrate would be less than 16 nm/min.

Therefore, the difference between the molar fractions of $SiO_2$ and $Al_2O_3$ should preferably be at most 59.5 molar %.

From the composition of the glass, the difference between the molar fractions of $SiO_2$ and $Al_2O_3$ has a lower limit of 42.5 molar %. The acid resistance at the time the difference between the molar fractions of $SiO_2$ and $Al_2O_3$ is 42.5 molar % (the etching rate (nm/min.) upon contact with hydrofluoric acid at a temperature of 50° C. and a concentration of 0.1 weight %) is 2000 nm/min.

Preferable constituent proportions (molar fractions) of the glass substrate which include other constituents may be in the following ranges:

$SiO_2$: 55–70 molar %
$Al_2O_3$: 1–12.5 molar %
$Li_2O$: 5–20 molar %
$Na_2O$: 0–12 molar %
$K_2O$: 0–2 molar %
MgO: 0–8 molar %
CaO: 0–10 molar %
SrO: 0–6 molar %
BaO: 0–2 molar %

$TiO_2$: 0–8 molar %
$ZrO_2$: 0–4 molar %

The glass substrate according to the present invention may contain, in addition to the above constituents, colorants of $Fe_2O_3$, MnO, NiO, $Cr_2O_3$, CoO, etc., and clarifiers of $SO_3$, $As_2O_3$, $Sb_2O_3$, etc. insofar as they do not impair the characteristics of the glass substrate.

Of the above constituents, $SiO_2$ is a major constituent of the glass. If the proportion of $SiO_2$ were less than 55 molar %, then the durability of the glass would be lowered, and if the proportion of $SiO_2$ exceeded 70 molar %, then the viscosity of the glass would be increased and the glass would not easily be melted. Therefore, the proportion of $SiO_2$ should preferably be in the range from 55 to 70 molar %.

$Al_2O_3$ serves to increase the rate of an ion exchange and also to increase the durability of the glass. If the proportion of $Al_2O_3$ were less than 1 molar %, then rate of an ion exchange and the durability of the glass would not be increased. If the proportion of $Al_2O_3$ were in excess of 12.5 molar %, then the viscosity of the glass would be increased, the devitrification resistance of the glass would be lowered, and the glass would not easily be melted. Therefore, the proportion of $Al_2O_3$ should preferably be in the range from 1 to 12.5 molar %.

$Li_2O$ is a constituent that is exchanged in an ion exchange, and serves to increase the solubility at the time the glass is melted. If the proportion of $Li_2O$ were less than 5 molar %, then the surface compressive stress of the glass substrate after the ion exchange would be insufficient, the viscosity of the glass would be increased, and the glass would not easily be melted. If the proportion of $Li_2O$ were in excess of 20 molar %, then the chemical durability of the glass substrate would be poor. Therefore, the proportion of $Li_2O$ should preferably be in the range from 5 to 20 molar %.

$Na_2O$ is a constituent that is exchanged in an ion exchange, and serves to increase the solubility at the time the glass is melted. If the proportion of $Na_2O$ were in excess of 12 molar %, then the chemical durability of the glass substrate would be poor. Therefore, the proportion of $Na_2O$ should preferably be at most 12 molar %.

$K_2O$ serves to increase the solubility at the time the glass is melted. If the proportion of $Na_2O$ were in excess of 2 molar %, then the chemical durability of the glass substrate would be poor, and the surface compressive stress of the glass substrate after the ion exchange would be lowered. Therefore, the proportion of $K_2O$ should preferably be at most 2 molar %.

MgO serves to increase the solubility of the glass. If the proportion of MgO were in excess of 8 molar %, then the liquid-phase temperature of the glass would be increased, and the devitrification resistance of the glass would be poor. Therefore, the proportion of MgO should preferably be at most 8 molar %.

CaO serves to increase the solubility of the glass. If the proportion of CaO were in excess of 10 molar %, then the liquid-phase temperature of the glass would be increased, and the devitrification resistance of the glass would be poor. Therefore, the proportion of CaO should preferably be at most 10 molar %.

SrO serves to increase the solubility of the glass. A large amount of SrO contained in the glass would not be preferable as it would increase the specific gravity of the glass. The proportion of SrO should preferably be at most 6 molar %.

BaO serves to increase the solubility of the glass. A large amount of BaO contained in the glass would not be preferable as it would increase the specific gravity of the glass. The proportion of BaO should preferably be at most 2 molar %.

$TiO_2$ is a constituent for increasing the chemical durability of the glass. If the proportion of $TiO_2$ were in excess of 8 molar %, then the liquid-phase temperature of the glass would be increased, and the devitrification resistance of the glass would be poor. Therefore, the proportion of $TiO_2$ should preferably be at most 8 molar %.

$ZrO_2$ is a constituent for increasing the chemical durability of the glass. If the proportion of $ZrO_2$ were in excess of 4 molar %, then the possibility for $ZrO_2$ to be separated out as fine crystals when the glass is melted would be increased. Therefore, the proportion of $ZrO_2$ should preferably be at most 4 molar %.

A method of manufacturing a glass substrate for use as an information recording medium according to the present invention includes an acid treatment process and an alkali treatment process. In the acid treatment process, the surface of a glass substrate is selectively dissolved to form fine pores therein. In the alkali treatment process which is carried out subsequent to the acid treatment process, the fine pores formed in the surface of the glass substrate are enlarged.

Specifically, when a glass made up of many constituents is treated by a treatment solution containing an acid, the constituents of the glass are not uniformly dissolved by the acid, but those constituents which are less resistant to the acid are dissolved preferentially. After the glass is treated in the acid treatment process, those constituents which are less resistant to the acid produce a porous region in the vicinity of the surface of the glass substrate. The constituents which are less resistant to the acid include an alkaline metal oxide, an alkaline earth metal oxide, an aluminum oxide, etc., and the constituents which are more resistant to the acid include a silica oxide, a titania oxide, a zirconia oxide, etc.

Therefore, a glass substrate which is more resistant to an acid is less likely to form a porous region after being treated with the acid, and does not produce sufficient surface irregularities when treated with an alkali after the acid treatment process.

According to the present invention, it has been found that in order for the glass substrate to achieve a surface roughness Ra of at least 0.3 nm in an alkali cleaning process after the acid treatment process, the etching rate of the glass substrate in a hydrofluoric acid bath (50° C.) having a concentration of 0.1 weight %, which represents an acid-resistant criterion, is required to be at least 16 nm/min.

The porous region produced by the acid treatment process in the glass substrate whose etching rate is at least 16 nm/min. would be completely removed if excessively etched by an alkaline solution. However, the etching process using the alkaline solution can be stopped at a stage where the pores in the porous region are enlarged by controlling conditions for the acid and alkali treatment processes.

By combining the acid and alkali treatment processes with each other, it is possible to form a finely roughened surface having an average surface roughness (Ra) in the range of 0.3 nm≦Ra<3.0 nm and including surface irregularities shaped and distributed isotropically and arranged substantially in succession.

If the glass substrate initially contains a large flaw, then the flaw tends to make some surface irregularities more visually noticeable than others or produce an undulating pattern of surface irregularities. To avoid such a drawback, it is preferable to carry out a polishing process prior to the acid treatment process for removing flaws and polishing marks having an amplitude of at least 5 nm thereby to make the-average surface roughness (Ra) less than 0.5 nm.

The polishing process may be performed in any desired way. If the polishing process is carried out using an abrasive composition, then the abrasive composition may contain a cerium oxide, a silicon oxide, an aluminum oxide, a magnetite oxide, a manganese oxide, or the like.

Because the glass substrate can be polished evenly and smoothly if the abrasive composition is well dispersed in an abrasive liquid, the abrasive liquid should preferably be alkaline or neutral. To make the abrasive liquid alkaline, an additive of potassium hydroxide, sodium hydroxide, ammonia, trimethanol amine, or the like is added to the abrasive liquid.

The manganese oxide may be $Mn_2O_3$, $Mn_3O_4$, or $MnO_2$, for example. Since $Mn_2O_3$, $Mn_3O_4$, and $MnO_2$ are easily ionized and dissolved in an acidic solution containing an oxidizing agent, when the glass substrate is treated by a treating agent containing an acid in the acid treatment process subsequent to the polishing process, the abrasive composition can easily be removed if an oxidizing agent such as a hydrogen peroxide solution, an ozone solution, or the like.

If the glass substrate is used as a hard disk substrate, then it is preferable to add, after the alkali treatment process, a chemically strengthening process for increasing the surface compressive stress of the glass substrate by way of an ion exchange.

The acid used in the acid treatment process may be hydrofluoric acid, sulfuric acid, nitric acid, or phosphoric acid. If hydrofluoric acid is used, then its concentration should preferably be in the range from 0.01 weight % to 0.5 weight % because it has a large etching effect on glass. If sulfuric acid, nitric acid, or phosphoric acid is used, then its concentration should preferably be in the range from 0.1 weight % to 5 weight % because it has a small etching effect on glass.

In the alkali treatment process, it is preferable to use an aqueous solution containing an alkaline constituent, a surface-active agent, and a chelating agent as major constituents.

The alkaline constituent may comprise caustic soda, sodium hydroxide, tetramethylammonium hydroxide, sodium carbonate, or potassium carbonate. The surface-active agent may comprise a nonionic surface-active agent such as polyoxyethyne alkyl ether or a polyoxyethylene derivative, a cationic surface-active agent such as quaternary ammonium salt, e.g., lauryltrimethyl ammonium chloride, higher amine halogenate, e.g., hardened tallow amine, or halide alkyl pyridium, e.g., dodecylpyridinium chloride, an anionic surface-active agent such as ester sodium alkylsulfate, sodium fatty acid, alkyl aryl sulfonate, or the like, or an amphoteric surface-active agent such as amino acid salt, e.g., sodium lauryl aminopropionic acid. The chelating agent may comprise dimethylglyoxime, dithizone, oxine, acetylacetone, glycine, ethylenediaminetetraacetic acid, or nitrilotriacetic acid.

It is preferable that the aqueous solution contain 0.001 weight %–5 weight % of the alkaline constituent, 0.001 weight %–1 weight % of the surface-active agent, and 0.001 weight %–1 weight % of the chelating agent.

The above and other objects, features, and advantages of the present invention will become apparent from the following description when taken in conjunction with the accompanying drawings which illustrate preferred embodiments of the present invention by way of example.

DETAILED DESCRIPTION OF THE PREFERRED EMBODIMENTS

Inventive Example 1

Figure 1:
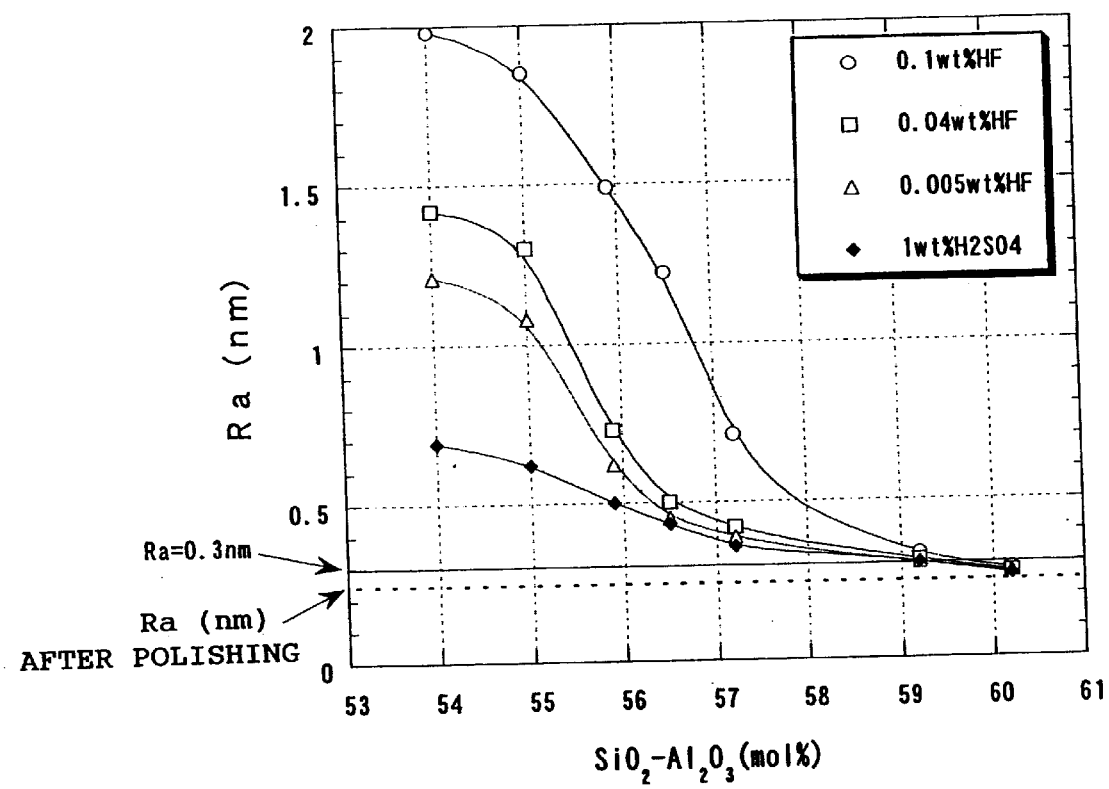
FIG. 1 is a graph showing the relationship between the difference between the molar fractions of $SiO_2$—$Al_2O_3$ and the average surface roughness (Ra)
Figure 2:
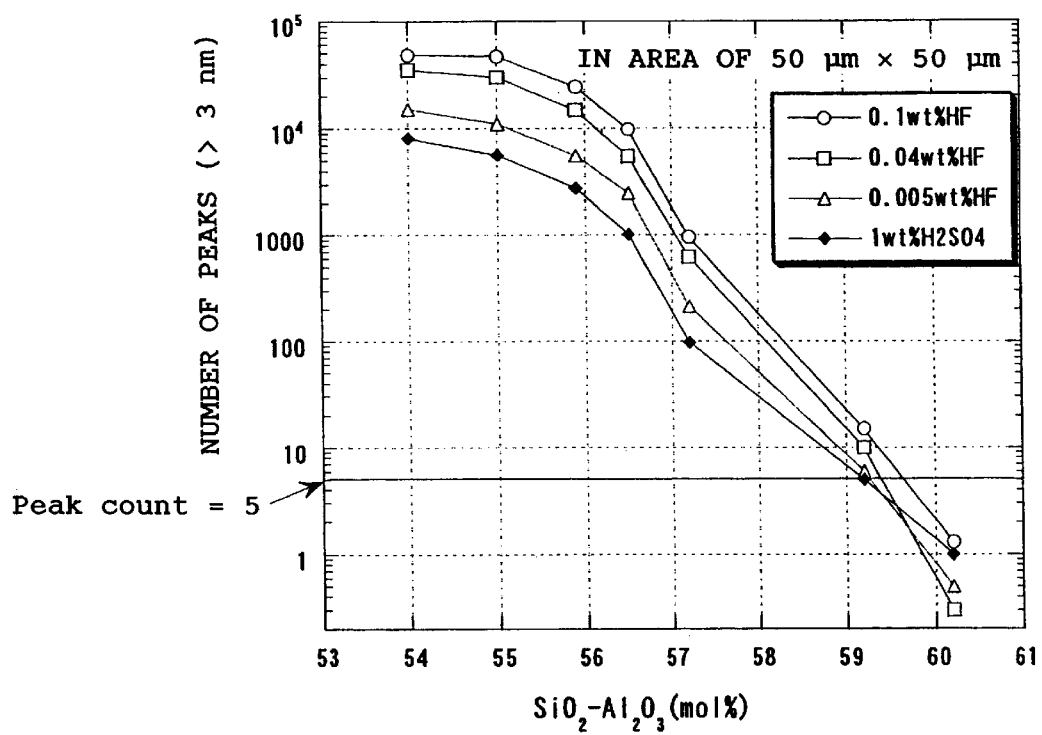
FIG. 2 is a graph showing the relationship between the difference between the molar fractions of $SiO_2$—$Al_2O_3$ and the number of convexities having a height of at least 3 nm in an area of 50 $\mu m \times 50$ $\mu m$.
Figure 3:
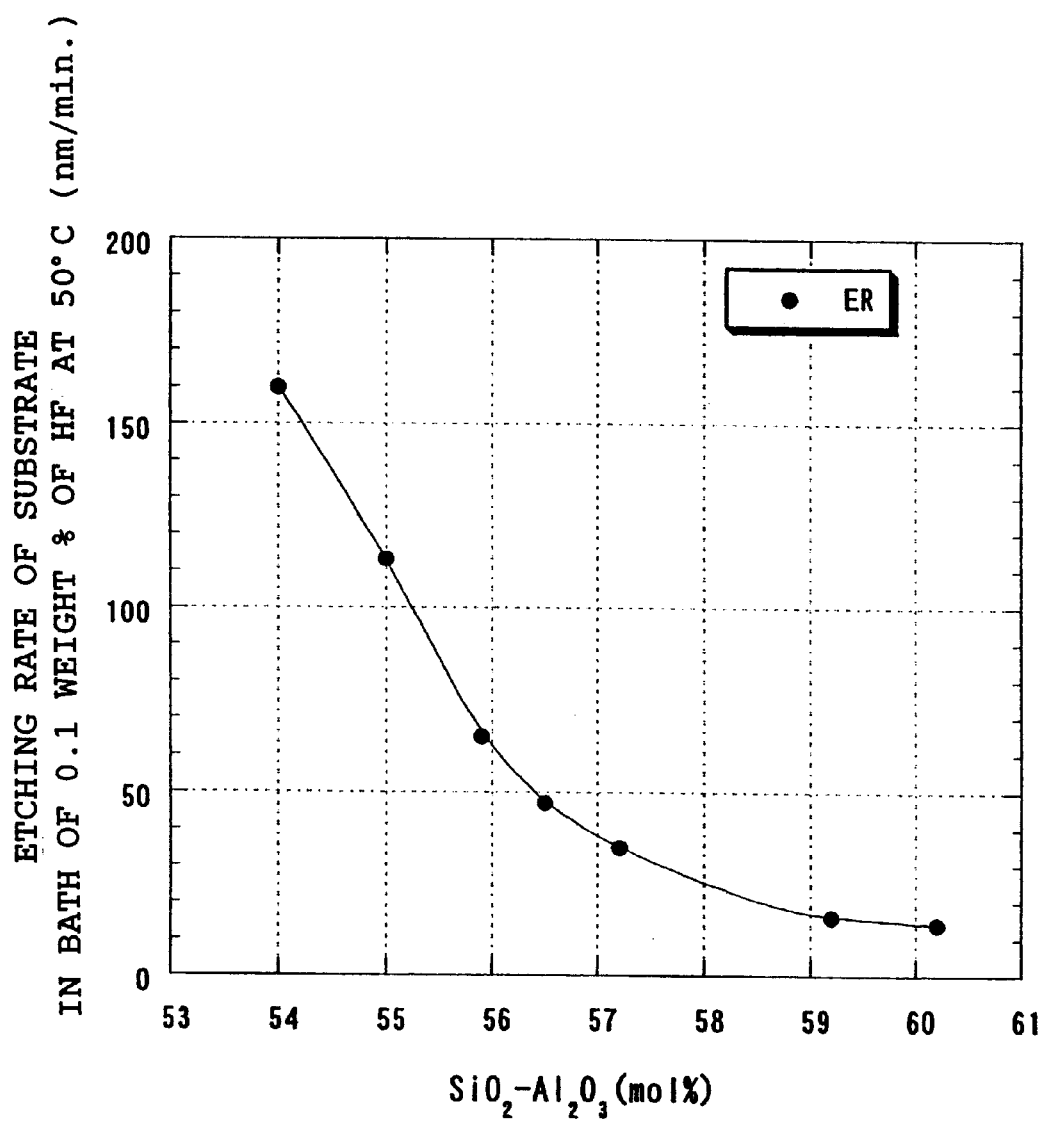
FIG. 3 is a graph showing the relationship between the difference between the molar fractions of $SiO_2$—$Al_2O_3$ and the acid resistance of a glass substrate (the etching rate (nm/min.) upon contact with hydrofluoric acid at a temperature of 50° C. and a concentration of 0.1 weight %.

An aluminosilicate glass substrate for use as an information recording medium, having a thickness of 1.0 mm and a diameter of 65 mm, was evenly polished to an average surface roughness Ra of about 0.25 nm, using an abrasive composition containing $CeO_2$ (MIREK manufactured by Mitsui Mining & Smelting Co., Ltd.) and a suede pad.

The glass substrate was made up of $SiO_2$: 65.5 molar %, $Al_2O_3$: 11.5 molar %, $Li_2O$: 8.0 molar %, $Na_2O$: 9.0 molar %, MgO: 2.4 molar %, and CaO: 3.6 molar %. The etching rate of the glass substrate using an aqueous solution of 0.1 weight % of hydrofluoric acid at a temperature of 50° C. was 160 nm/min.

After the glass substrate was rinsed in a pure water bath, it was scrubbed with pure water to remove most of the abrasive composition.

Then, the glass substrate was dipped in a bath of 1.00 weight % of sulfuric acid, a bath of 0.02 weight % of hydrofluoric acid, or a bath of 0.10 weight % of hydrofluoric acid which was kept at 40° C., for 2.5 minutes. After an ultrasonic energy of 1 W/cm² at about 48 kHz was applied to the glass substrate for 2.5 minutes, the glass substrate was lifted out of the bath, and then rinsed in a pure water bath to remove the chemical therefrom.

Then, the glass substrate was dipped in a bath of a commercially available alkaline detergent (pH 11, RB25 manufactured by Chemical Products Co., Ltd.) kept at 40° C. for 2.5 minutes. After an ultrasonic energy of 1 W/cm² at about 48 kHz was applied to the glass substrate for 2.5 minutes, the glass substrate was lifted out of the bath, and then rinsed in a pure water bath to remove the chemical therefrom.

The process of dipping the glass substrate in the pure water bath to rinse the glass substrate was repeated three times. Finally, the glass substrate was dipped in a bath of isopropyl alcohol, and after an ultrasonic energy at about 48 kHz was applied to the glass substrate for 2 minutes, the glass substrate was dried in a vapor of isopropyl alcohol for 1 minute, thus producing a specimen of Inventive Example 1.

Inventive Example 2

The glass substrate was made up of $SiO_2$: 66.0 molar %, $Al_2O_3$: 11.0 molar %, $Li_2O$: 8.0 molar %, $Na_2O$: 9.0 molar %, MgO: 2.4 molar %, and CaO: 3.6 molar %. The etching rate of the glass substrate using an aqueous solution of 0.1 weight % of hydrofluoric acid at a temperature of 50° C. was 113 nm/min. The glass substrate was processed under the same conditions as in Inventive Example 1, thus producing a specimen of Inventive Example 2.

Inventive Example 3

The glass substrate was made up of $SiO_2$: 66.1 molar %, $Al_2O_3$: 9.6 molar %, $Li_2O$: 7.3 molar %, $Na_2O$: 9.6 molar %, MgO: 2.9 molar %, CaO: 4.3 molar %, and $K_2O$: 0.2 molar %. The etching rate of the glass substrate using an aqueous solution of 0.1 weight % of hydrofluoric acid at a temperature of 50° C. was 47 nm/min. The glass substrate was processed under the same conditions as in Inventive Example 1, thus producing a specimen of Inventive Example 3.

Inventive Example 4

The glass substrate was made up of $SiO_2$: 65.3 molar %, $Al_2O_3$: 8.1 molar %, $Li_2O$: 5.2 molar %, $Na_2O$: 12.3 molar %, MgO: 2.8 molar %, CaO: 4.1 molar %, $K_2O$: 0.2 molar %, and SrO: 2.0 molar %. The etching rate of the glass substrate using an aqueous solution of 0.1 weight % of hydrofluoric acid at a temperature of 50° C. was 35 nm/min. The glass substrate was processed under the same conditions as in Inventive Example 1, thus producing a specimen of Inventive Example 4.

Inventive Example 5

The glass substrate was made up of $SiO_2$: 66.3 molar %, $Al_2O_3$: 7.1 molar %, $Li_2O$: 5.2 molar %, $Na_2O$: 12.3 molar %, MgO: 2.8 molar %, CaO: 4.1 molar %, $K_2O$: 0.2 molar %, and SrO: 2.0 molar %. The etching rate of the glass substrate using an aqueous solution of 0.1 weight % of hydrofluoric acid at a temperature of 50° C. was 16 nm/min. The glass substrate was processed under the same conditions as in Inventive Example 1, thus producing a specimen of Inventive Example 5.

Inventive Example 6

The glass substrate was made up of $SiO_2$: 66.1 molar %, $Al_2O_3$: 9.6 molar %, $Li_2O$: 7.3 molar %, $Na_2O$: 9.6 molar %, MgO: 2.9 molar %, CaO: 4.3 molar %, and $K_2O$: 0.2 molar %. The etching rate of the glass substrate using an aqueous solution of 0.1 weight % of hydrofluoric acid at a temperature of 50° C. was 47 nm/min. The glass substrate was processed under the same conditions as in Inventive Example 1, except that the glass substrate was evenly polished to an average surface roughness Ra of about 0.40 nm using an abrasive composition containing $CeO_2$ and a suede pad, thus producing a specimen of Inventive Example 6.

Inventive Example 7

The glass substrate was made up of $SiO_2$: 66.1 molar %, $Al_2O_3$: 9.6 molar %, $Li_2O$: 7.3 molar %, $Na_2O$: 9.6 molar %, MgO: 2.9 molar %, CaO: 4.3 molar %, and $K_2O$: 0.2 molar %. The etching rate of the glass substrate using an aqueous solution of 0.1 weight % of hydrofluoric acid at a temperature of 50° C. was 47 nm/min. The glass substrate was processed under the same conditions as in Inventive Example 1, except that the glass substrate was evenly polished to an average surface roughness Ra of about 0.31 nm using an abrasive composition containing $Mn_2O_3$ (NANOBIX manufactured by Mitsui Mining & Smelting Co., Ltd.) and a nonwoven cloth and that a mixture of 1 weight % of sulfuric acid and 3 weight % of hydrogen peroxide solution was used instead of sulfuric acid and hydrofluoric acid in the acid treatment process, thus producing a specimen of Inventive Example 7.

Inventive Example 8

The glass substrate was made up of $SiO_2$: 59.7 molar %, $Al_2O_3$: 3.8 molar %, $Li_2O$: 14.8 molar %, $Na_2O$: 1.4 molar %, MgO: 4.2 molar %, CaO: 7.2 molar %, $K_2O$: 0.3 molar %, SrO: 4.2 molar %, $TiO_2$: 2.9 molar %, and $ZeO_2$: 1.5 molar %. The etching rate of the glass substrate using an aqueous solution of 0.1 weight % of hydrofluoric acid at a temperature of 50° C. was 65 nm/min. The glass substrate was processed under the same conditions as in Inventive Example 1, except that the glass substrate was evenly polished to an average surface roughness Ra of about 0.25 nm using an abrasive composition containing $CeO_2$ and a suede pad, thus producing a specimen of Inventive Example 8.

Comparative Example 1

The glass substrate was made up of $SiO_2$: 67.3 molar %, $Al_2O_3$: 7.1 molar %, $Li_2O$: 6.1 molar %, $Na_2O$: 11.3 molar %, MgO: 2.4 molar %, CaO: 3.6 molar %, $K_2O$: 0.2 molar %, and SrO: 2.0 molar %. The etching rate of the glass substrate using an aqueous solution of 0.1 weight % of hydrofluoric acid at a temperature of 50° C. was 14 nm/min. The glass substrate was processed under the same conditions as in Inventive Example 1, except that the glass substrate was evenly polished to an average surface roughness Ra of about 0.25 nm using an abrasive composition containing $CeO_2$ and a suede pad, thus producing a specimen of Comparative Example 1.

Comparative Example 2

The glass substrate was made up of $SiO_2$: 66.1 molar %, $Al_2O_3$: 9.6 molar %, $Li_2O$: 7.3 molar %, $Na_2O$: 9.6 molar %, MgO: 2.9 molar %, CaO: 4.3 molar %, and $K_2O$: 0.2 molar %. The etching rate of the glass substrate using an aqueous solution of 0.1 weight % of hydrofluoric acid at a temperature of 50 C was 47 nm/min. The glass substrate was processed under the same conditions as in Inventive Example 1, except that the glass substrate was unevenly polished to an average surface roughness Ra of about 0.40 nm to provide at least 10 polishing marks having a depth ranging from 20 nm to 30 nm and a length of at least 2 μm in an area of 50 μm×50 μm, using an abrasive composition containing $CeO_2$ and a suede pad, thus producing a specimen of Comparative Example 2.

Comparative Example 3

The glass substrate was made up of $SiO_2$: 66.1 molar %, $Al_2O_3$: 9.6 molar %, $Li_2O$: 7.3 molar %, $Na_2O$: 9.6 molar %, MgO: 2.9 molar %, CaO: 4.3 molar %, and $K_2O$: 0.2 molar %. The etching rate of the glass substrate using an aqueous solution of 0.1 weight % of hydrofluoric acid at a temperature of 50° C. was 47 nm/min. The glass substrate was processed under the same conditions as in Inventive Example 1, except that the glass substrate was evenly polished to an average surface roughness Ra of about 0.50 nm using an abrasive composition containing $CeO_2$ and a suede pad, thus producing a specimen of Comparative Example 3.

The specimens of Inventive Examples 1–8 and Comparative Examples 1–3 were observed for substrate surface roughness (Ra) in a field of view of 50 μm×50 μm by a scanning probe microscope (SPI3700 manufactured by SPM SII). The observed results are given in the table shown below. The numbers of peaks having a height greater than 3 nm and the numbers of peaks having a height greater than 15 nm, observed in the field of view of 50 μm×50 μm are also given in the table. In the table, substrate surface irregularities as observed by the scanning probe microscope were evaluated as "uniform" if they were successive and isotropic, and "ununiform" otherwise.

It can be seen from the above table that if the etching rate (with 0.1 weight % of hydrofluoric acid at 50° C.), which serves as an acid-resistant criterion, was at least 16 nm/mm. as with Inventive Examples 1–8, isotropic and successive surface irregularities were formed on the glass substrates by the alkali treatment process subsequent to the acid treatment process, the surface irregularities having an average surface roughness Ra in the range of 0.3 nm≦Ra<3.0 nm and including 5 to 50000 peaks of a height of at least 3 nm and no peaks of a height of at least 15 nm in the area of 50 $\mu$m×50 $\mu$m. If the etching rate (with 0.1 weight % of hydrofluoric acid at 50° C.) was less than 16 nm/min. as with Comparative Example 1, no sufficient pores were formed in the glass substrate by the acid treatment process, but surface irregularities were formed on the glass substrates by the alkali treatment process, the surface irregularities having an average surface roughness Ra less than 0.3 nm and including 5 to 50000 peaks of a height of at least 3 nm and no peaks of a height of at least 15 nm in the area of 50 $\mu$m×50 $\mu$m. The glass substrate according to Comparative Example 1 had a smooth surface.

When the glass substrate was evenly polished and had an average surface roughness Ra less than 0.5 nm after the polishing process as with Inventive Examples 1–8, no visually noticeable polishing trace was produced by the alkali treatment process subsequent to the acid treatment process, but isotropic and successive surface irregularities having an average surface roughness Ra in the range of 0.3 nm≦Ra<3.0 nm were formed on the glass substrates.

When the glass substrate was unevenly polished to an average surface roughness Ra less than 0.5 nm to provide at least 10 polishing marks having a depth ranging from 20 nm to 30 nm and a length of at least 2 $\mu$m in the area of 50 $\mu$m×50 $\mu$m, as with Comparative Example 2, ununiform and discrete surface irregularities, including 100 or more peaks having a height of at least 15 nm, were formed on the glass substrate even though the average surface roughness Ra was in the range of 0.3 nm≦Ra<3.0 nm.

When the glass substrate was polished to an average surface roughness Ra of at least 0.5 nm as with Comparative Example 3, ununiform and discrete surface irregularities, including 100 or more peaks having a height of at least 15 nm in the area of 50 $\mu$m×50 $\mu$m, were formed on the glass substrate.

According to the present invention, as described above, a glass substrate having a predetermined level of acid resistance is treated with an acid and an alkali under appropriate conditions to produce fine surface irregularities which have an average surface roughness Ra in the range of 0.3 nm≦Ra<3.0 nm and include 5 to 50000 peaks of a height of at least 3 nm and no peaks of a height of at least 15 nm in the observed area of 50 $\mu$m×50 $\mu$m. The surface irregularities are isotropic, i.e., not localized in any directions but present in all directions, and substantially successive.

Although certain preferred embodiments of the present invention have been shown and described in detail, it should be understood that various changes and modifications may be made therein without departing from the scope of the appended claims.

What is claimed is:

1. A method of manufacturing a glass substrate for use as an information recording medium, comprising the steps of:

treating a surface of the glass substrate with a treating agent containing an acid to selectively dissolving the surface of the glass substrate to form fine pores therein; and thereafter treating the surface of the glass substrate with a treating agent containing an alkali to enlarge said fine pores.

2. A method according to claim 1, further comprising the step of:

before treating the surface of the glass substrate with the treating agent containing the acid, polishing the surface of the glass substrate to remove flaws and polishing marks having an amplitude of at least 5 nm thereby to achieve an average surface roughness (Ra) less than 0.5 nm.

3. A method according to claim 2, wherein the surface of the glass substrate is polished with an abrasive liquid which is either alkaline or neutral.

4. A method according to claim 1, further comprising the step of:

after treating the surface of the glass substrate with the treating agent containing the alkali, chemically strengthening the surface of the glass substrate by way of by an ion exchange to increase a surface compressive stress of the surface of the glass substrate.

5. A method according to claim 1, wherein said acid comprises hydrofluoric acid having a concentration ranging from 0.01 weight % to 0.5 weight %.

6. A method according to claim 1, wherein said acid comprises sulfuric acid, nitric acid, or phosphoric acid having a concentration ranging from 0.1 weight % to 5 weight %.

7. A method according to claim 1, wherein the surface of the glass substrate is treated with the treating agent containing the alkali in an aqueous solution which contains an alkaline constituent, a surface-active agent, and a chelating agent.

8. A method according to claim 7, wherein alkaline constituent comprises caustic soda, sodium hydroxide, tetramethylammonium hydroxide, sodium carbonate, or potassium carbonate, said surface-active agent comprises a non-ionic surface-active agent, a cationic surface-active agent, an anionic surface-active agent, or an amphoteric surface-active agent, and said chelating agent comprises dimethylglyoxime, dithizone, oxine, acetylacetone, glycine, ethylenediaminetetraacetic acid, or nitrilotriacetic acid, said aqueous solution containing 0.001 weight %–5 weight % of the alkaline constituent, 0.001 weight %–1 weight % of the surface-active agent, and 0.001 weight %–1 weight % of the chelating agent.

* * * * *